US006253191B1

(12) United States Patent
Hoffman

(10) Patent No.: US 6,253,191 B1
(45) Date of Patent: Jun. 26, 2001

(54) BROWNFIELDS INVESTING

(76) Inventor: Cheryl Hoffman, 1234 Snowberry Dr., Golden, CO (US) 80401

( * ) Notice: Subject to any disclaimer, the term of this patent is extended or adjusted under 35 U.S.C. 154(b) by 0 days.

(21) Appl. No.: 09/488,112

(22) Filed: Jan. 20, 2000

Related U.S. Application Data
(60) Provisional application No. 60/152,467, filed on Sep. 3, 1999.

(51) Int. Cl.[7] ....................................................... G06F 17/60
(52) U.S. Cl. ............................................................. 705/35
(58) Field of Search .................................. 705/35, 36, 38, 705/39

(56) References Cited

U.S. PATENT DOCUMENTS 5,214,579 * 5/1993 Wolfberg et al. ..................... 364/408
5,812,987 * 9/1998 Luskin et al. ........................... 705/36

OTHER PUBLICATIONS

Lucas, Kathleen G., "Fair share" liability: A brighter environmental future, Hoosier Banker, v81, n7, p24–25, Jul. 1997.*

Farley, Michael, The challenging task of encouraging "Brownfield" redevelopment, Michigan Banker, v10, n9, p68–69, Sep. 1998.*

O'Neil, Jerome, ASTI provides Michigan Community banks a full spectrum of environmental tools aimed at minimizing commercial loan risk, Michigan Banker, v11, n8,p18–20, Aug. 1999.*

Cities wrestle with greenfields impacts of environmental laws, Public Finance Watch, v7, n39, p4, Oct. 1993.*

Slutzky, David and Jacobson, Lawrence, EPA's Brownfields Initiatives, Mortgage Banking, p91–93, Jul. 1995.*

Crabb, Charlene with Cooper, Cathy, Building on Brownfields, Chemical Engineering, v105, n13, p28, Dec. 1998.*

Buente, David T. and Crough, Maureen M., Significant Enviromental Law Developments, The Secured Lender, p.52–66, May 1998.*

Jacobson, Thomas O., Mortgage–Equity Analysis in Contaminated Property Valutation, The Appraisal Journal, p46–55, Jan. 1998.*

Buente, David T. et al., Environmental law developments, The Secured Lender, v52, n2, p62, Mar. 1996.*

J. Fialkn, "Maine Experiment May Point the Way to Ending Tangle of Litigation Around U.S. Superfund Law," Wall Street Journal, Apr. 29, 1998, one page.

(List continued on next page.)

Primary Examiner—Robert W. Downs
Assistant Examiner—Pedro R. Kauof
(74) Attorney, Agent, or Firm—Kenyon & Kenyon

(57) ABSTRACT

A Brownfields investment vehicle, and a system and method for investing in Brownfields-related projects are provided that are capable of supporting all aspects of a Brownfields remediation/development/redevelopment project, while shielding investors from environmental liability. The Brownfields fund makes, for example, non-recourse, participating capital investments or Brownfields Value Contracts ("BVC") to a number of "special purpose vehicles" for specific Brownfields projects according to fund investment criteria determined by a fund manager. An investor's risk of incurring environmental liability is substantially reduced by providing that the Brownfields fund is completely passive with respect to the Brownfields project, taking no security or mortgage interest in the Brownfields.

29 Claims, 10 Drawing Sheets

OTHER PUBLICATIONS

Letter dated Jul. 10, 1998, TRC Environmental Corporation to Cyprus Amax Minerals Company, 2 pp.; Letter dated Aug. 14, 1997, TRC Environmental Corporation to Cyprus Amax Mineral Company, 1 page; TRC's Exit Strategies ™ brochure, 7 pp.

AIG AMB Greenfield Investment Alliance, L.L.C. Environmentally Challenged Real Estate 1999 Investment Criteria. 2 pp.

Letter dated Nov. 1, 2000 from Merrill Lynch to New York State Common Retirement Fund, 1 page; GreenPark Investment Partners II, I.P. brochure, 46 pp.

M. Rich, "Investment Fund Launched to Focus on Polluted Sites," *Wall Street Journal*, Dec. 20, 2000, 2pp.

\* cited by examiner

| | |
|---|---|
| 210 | General Fund Investment Criteria |
| 305 | The fund may invest in BVCs only after receiving a minimum level of investment into the fund (i.e., from investors 105 of Fig. 1). |
| 310 | The fund must invest in more than one Brownfields project and more than one BVC. |
| 315 | The overall investment in the fund must be large relative to the size of the Brownfields projects to which the fund issues a BVC. |
| 320 | The duration of the fund itself must be long-term relative to the duration of the Brownfields projects to which the fund issues a BVC. |
| 325 | Investors in the fund must be completely passive, having no ownership interests in the Brownfields, no security or mortgage interest in the Brownfields, and no obligations of environmental remediation, only an interest in the BVC. |
| 330 | Possibility of leveraging of the fund. |

FIG. 3

| | |
|---|---|
| 220 | General Project Investment Criteria |
| 405 | Duration of the BVC for a particular Brownfields project must be less than a predetermined authorized duration |
| 410 | Target rate of return for the particular BVC must be greater than a predetermined minimum |
| 415 | Investment or capital investment amount for the particular BVC must be greater than a predetermined minimum |
| 420 | Investment or capital investment amount for the particular BVC must be less than a predetermined maximum |

FIG. 4

| | |
|---|---|
| 230 | Technical Project Criteria |
| 501 | Cash flow participation in the particular Brownfields project defined in the BVC issued must be at a predetermined level |
| 502 | Types of real estate development |
| 505 | Geographic standards |
| 510 | Categories of contamination |
| 520 | Standards for risk management |
| 525 | Evaluation of government subsidies, grants, etc. |

FIG. 5

| 240 | Technical Criteria for Special Purpose Vehicles |
|---|---|
| 605 | Expertise in real estate development |
| 610 | Expertise in pollution remediation |
| 615 | Expertise in environmental risk management |
| 620 | Expertise in land use planning |
| 625 | Financial strength to meet its contractual obligations |
| 630 | Character references and track record |

FIG. 6

| 250 | Approved Entity Structures for Special Purpose Vehicles |
|---|---|
| 705 | A joint venture between an original owner and a real estate developer |
| 710 | A limited liability company, trust, partnership or other corporation formed and owned by a real estate developer |
| 715 | A limited liability company formed and owned by an original Brownfields owner, a real estate developer, and other partners |
| 720 | A limited liability company, trust, partnership or other corporation formed and owned by a developer and partners to purchase Brownfields properties over time with fixed installments, contingent installments, or fixed installments in combination with cash flow participation to the original Brownfields owner. |

FIG. 7

BROWNFIELDS INVESTING

This appln claims benefit of Provisional No. 60/152,467 filed Sep. 3, 1999.

FIELD OF THE INVENTION

The present invention relates to a system and method and financial vehicle for investing in Brownfields.

BACKGROUND INFORMATION

For many years, contaminated properties have been considered a current and future liability to their owners (current and future), and to the communities in which they are located. The market value of real property is directly affected by contamination and pollution. Valuation of real property is negatively effected by risks that are not quantifiable in terms of time and/or money. Valuation affects decision making during cleanup of contaminated property, and, likewise, decision making during remediation affects valuation, of the contaminated property and surrounding properties. The result has been that many of these properties are idle and abandoned in spite of their potential value.

"Brownfields" generally includes real properties in a contaminated or stigmatized condition. Brownfields may include, for example, abandoned, idle or under-utilized sites, urban, rural, industrial or nonindustrial real property where development, expansion or redevelopment is complicated by real or perceived contamination. In contrast, "Greenfields" are undeveloped properties located mainly in suburban or rural areas. Fear of contamination is one factor that may steer real estate development to Greenfields, with unintended but nonetheless undesirable consequences such as urban sprawl, habitat destruction or loss of land suitable for agriculture.

Conversely, redevelopment of Brownfields is expected to create economic opportunities through physical improvements, job creation, tax revenues and improved urban planning. Additionally, by redeveloping Brownfields, Greenfields, including, for example, agricultural land, may be preserved and further deterioration of urban cores can be minimized. There is also a substantial unmet need for private investment (e.g., debt, equity and hybrid investments) in Brownfields remediation. This is primarily due to the exposure (or fear of exposure) by investors to environmental liability.

The Environmental Protection Agency's (the "EPA") Environmental Financial Advisory Board (the "EFAB") spend two years researching issues related to financing Brownfields remediation, and issued five reports. The EFAB's core conclusion, set forth in a published letter dated May 31, 1997, from Robert O. Lenna and John C. Wise to EPA Administrator Carol M. Browne, was "wide-scale and long-term success of Brownfields redevelopment must be sustainable in the private sector." However, there continues to be relatively few capital sources for these projects due to the perceived risk. The risk includes:

(1) financial risk, either because the environmental risk is unknown or because it is difficult to measure; and (2) liability associated with environmental risk, including liability for past effects of contamination (lender liability) and liability of borrowers from noncompliance that could affect their ability to meet financial obligation and the value of the collateral.

There is public acknowledgment and support for the need for private investment in Brownfields remediation. The EPA has now attenuated previous, more burdensome requirements, and has developed risk-based criteria for cleanup to allow the cleanup levels to be based in part on the future use of land, which is directly related to the potential for exposure to contaminants of concern.

In a report dated December 1997, the EFAB stated the following:

In virtually every Brownfields project scenario, the absence of a viable redevelopment project results in the perpetuation of two environmentally undesirable trends: (1) urban decay (environmentally, and further deterioration of existing taxpayer-paid infrastructure, and lack of economic opportunity for nearby residents); and (2) destruction of "Greenfields" to build development that could locate on Brownfields sites.

In our view, those two undesirable trends are not sustainable in the long term as a matter of national environmental or economic policy. We believe that requiring clean-ups to meet appropriately-protective risk-based standards will both: (1) protect the public health and the environment; and (2) help to avoid the perpetuation of those two environmentally undesirable trends.

In addition to risk-based cleanup criteria, public support for Brownfields remediation exists in the Taxpayer Relief Act of 1007. Under this Act, a taxpayer may be able to deduct qualified remediation expenses incurred to clean up properties in several targeted areas. Moreover, taxpayers meeting the requirements of the Taxpayer Relief Act of 1997 are eligible to fully deduct Brownfields cleanup costs in the year in which the costs are incurred, rather than capitalizing and amortizing the costs over several years.

Moreover, certain recent revisions to the Comprehensive Environmental Response, Compensation, and Liability Act (CERCLA) are aimed at protecting passive investors. In particular, CERCLA Section 101(20)(A) contains a secured creditor exemption which eliminates certain liability for lenders who hold indicia of ownership in a Brownfields facility primarily to protect their security interest in that facility, provided they do not participate in management of the facility.

Despite the widespread public acknowledgment of the need for large private investment in Brownfields remediation, and despite the public support for such private investment in the form of rational environmental regulation and tax incentives, there is no useful method or vehicle for large-scale, long-term investment in Brownfields remediation. Conventional private investment in remediation of Brownfields includes only small funds investing on a project-by-project basis, with the quantity of capital available being small in relation to the remediation and development cost of the project financed. Because the remediation costs of individual projects financed is often so large in relation to the type of funds available, the investment risks are large, for financing the cleanup phase, and the cost of capital, therefore, high and the success of the process may be dependent upon the market for the land and development subsequent to clean up, increasing the risk. Moreover, the legal and financing phases are long and expensive. Financial failure of a single project in such a financial model is a disaster for all of the investors. However, if the ultimate development of the property is also considered, the cost of remediation becomes economically feasible in relation to the long-term value.

Moreover, environmental remediation liability, i.e., the legal duties under applicable federal, state and local statutes and regulations regarding environmental liabilities, may attach not only to the owners of the Brownfields, but also to "operators." Operators may include, for example, lenders and others who participate in decision making regarding the Brownfields. Thus, lenders investing in properties needing remediation can themselves become liable for remediation costs if lenders take mortgages to secure their loans. This risk of direct exposure to environmental remediation liability further chills investor interest and increases the cost of privately-financed remediation of Brownfields. Thus, historically, only a small number of investors were able and willing to invest privately in projects involving Brownfields remediation and they expect high returns relative to the risk. This capital cost is another barrier to the feasibility of these projects.

Because of the traditional high risks associated with Brownfields remediation investment, few vehicles exist for such investment. Moreover, few managers have developed expertise sufficient to administer the few such investment vehicles that do exist. There are approximately 5000 registered professional investment advisors for management of a wide variety of investments in stocks, stock portfolios, bonds, and stock and bond funds. There are only a few dozen registered professional real estate investment managers, and only a handful of these managers control the majority of the market (75%). These managers offer very traditional pure equity, first mortgage and participating mortgage products not suited to the this type of investment. However, this investor base is the best source for long term capital.

With few sources of investment capital available for financing Brownfields remediation, Brownfields' owners must often rely on their own financial resources to provide the funds for remediation. These owners include most major industrial corporations, family owned businesses, government entities, farmers, developers and many others. This further constrains resources available to the ongoing business interests of these owners, and therefore, redevelopment is delayed indefinitely.

Moreover, real estate developers typically encounter substantial project delays with attendant costs because there is no single mode of financing that will cover all phases (e.g., acquisition, entitlement, development and construction) of a project. Developers must first arrange financing for acquiring the property and developing plans and designs. The project then typically halts for weeks or months while the developer arranges construction financing. Near the end of the construction phase, the project may be effectively halted again while the developer seeks and arranges permanent financing or sells the project. All three stages of financing are typically provided by separate sources, and financing fees may be required in connection with each stage of financing. Thus, there is a substantial need for a single source of financing to address all stages of a real estate project to lower the cost of capital and facilitate faster completion of a projection. This will also make projects that are not feasible today become feasible including redevelopment of Brownfields.

Furthermore, the three stages of financing are typically carried as full debt on the developer's balance sheet. Carrying environmental project-related debt on the balance sheet reduces the developer's and/or owner's equity, and, therefore, reduces the developer's and/or owner's ability to borrow funds for new projects, expansion, or to support normal operations. Accordingly, there is a need for a method of financing real estate development without reducing a developer's equity or borrowing power ("off balance sheet" financing and/or investment).

SUMMARY

The present invention responds to the need for private investment in projects involving Brownfields remediation/ development/redevelopment. In accordance with an example embodiment of the present invention, a Brownfields investment vehicle (financial instrument), and a system and method for investing in Brownfields-related projects are provided that are capable of supporting all aspects of a Brownfields remediation/development/ redevelopment project, while shielding investors from environmental liability.

In one example embodiment, a Brownfields investment fund is established in accordance with certain criteria. The Brownfields fund provides capital on a non-recourse basis through Brownfields Value Contracts ("BVC") to a number of approved "special purpose vehicles" for specific Brownfields projects according to fund investment criteria determined by a fund manager. These "special purpose vehicles" meet technical and financial criteria established by a fund manager.

The present invention substantially reduces an investors risk in incurring environmental liability by providing that the Brownfields fund is completely passive with respect to the Brownfields project, taking no security or mortgage interest in the Brownfields property.

BRIEF DESCRIPTION OF THE DRAWINGS

FIG. 3 illustrates examples of general fund investment criteria 210 used by the fund manager in determining whether or not the Brownfields fund should make a BVC to a Brownfields project.

FIG. 4 illustrates examples of general project investment criteria 220 that the fund manager may require a particular Brownfields project to meet in order for the Brownfields fund to make a BVC therein.

FIG. 5 illustrates examples of technical project criteria which the Brownfields project may be required to meet in order to qualify for a capital investment from the Brownfields fund through a BVC.

FIG. 6 shows example technical criteria which the special purpose vehicle may be required to meet in order to be approved by a fund manager.

FIG. 7 illustrates examples of approved entity structures according to the example embodiment of the present invention.

DETAILED DESCRIPTION

Figure 1:
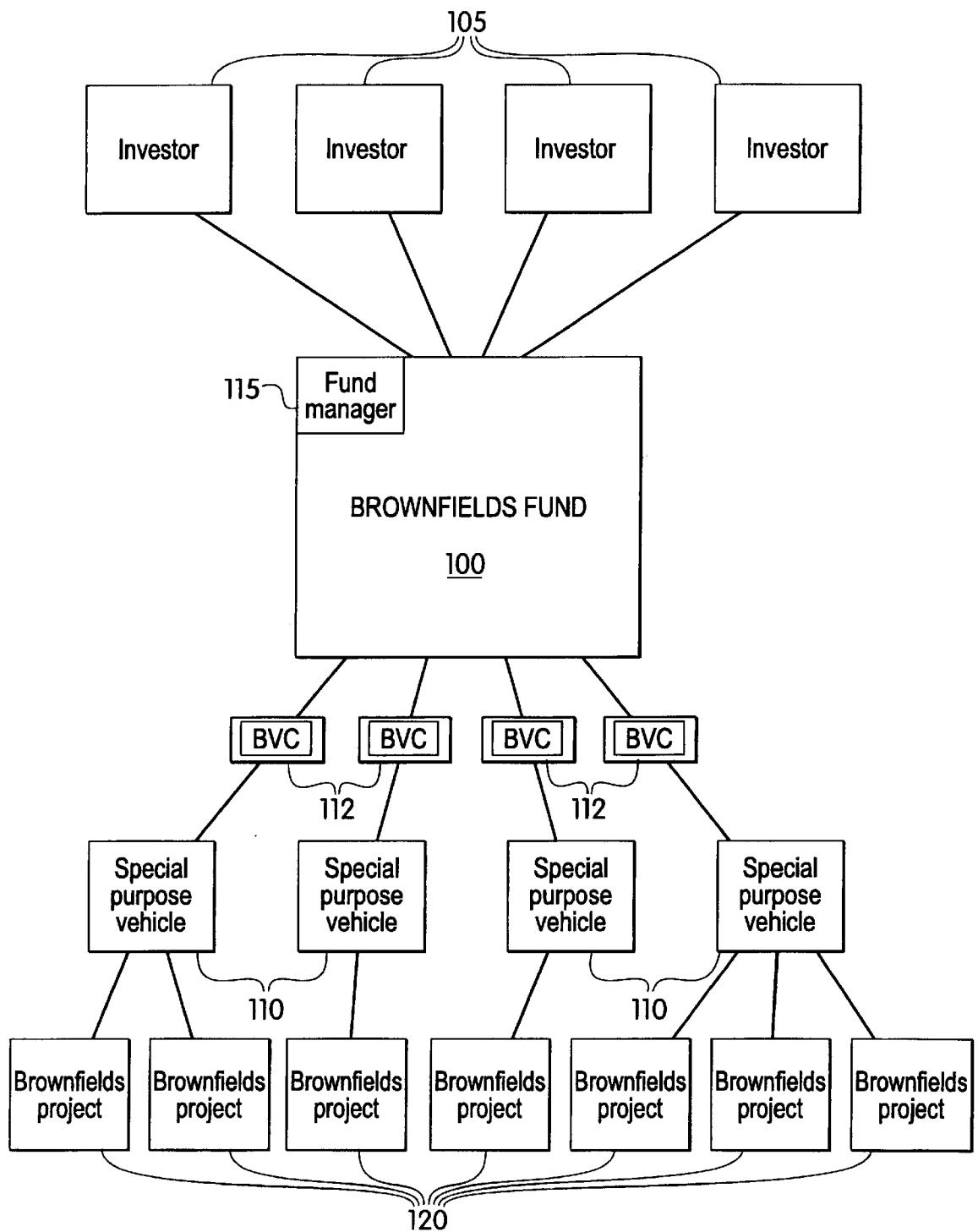
FIG. 1 shows an overview of an overall architecture of a system for Brownfields development investing according to an example embodiment of the present invention.

Overview: FIG. 1 shows an overview of the overall architecture of a system for Brownfields remediation, development and redevelopment investing according to an example embodiment of the present invention. As illustrated, a Brownfields investment fund 100 is established in which investors 105 invest (e.g., provide capital). In accordance with the example embodiment of the present invention, the Brownfields investment fund 100 may be any type of business organization created for financing Brownfields projects according to the present invention, including, but not limited to organizations such as a limited liability partnership, a limited liability company, a trust or other corporation.

The investors 105 may be, for example, parties who provide capital to the Brownfields fund for the purpose of earning a return on their capital through BVCs 112 made by the Brownfields fund. These investors 105 may be, for example, accredited investors under federal securities laws, qualified investors, sophisticated investors, ERISA investors, private placement investors, or any other type of private equity investor.

The Brownfields fund 100 makes, for example, non-recourse, participating capital investments or "Brownfields Value Contracts" ("BVC") 112 to a number "special purpose vehicles" 110, for specific Brownfields projects 120 according to fund investment criteria determined by a "fund manager" 115. In the example embodiment of the present invention, a BVC 112 may include, for example, a financial obligation resulting from application and compliance with specific criteria to create value in development or redevelopment of Brownfields and provides returns from that value to investors. For example, the BVC 112 may set forth terms and conditions such as: i) the amount of capital to be provided to a special purpose vehicle, such capital may be provided in a lump sum, or in installments; ii) details of an interest in future cashflows provided to the Brownfields fund by the special purpose vehicle, iii) performance requirements of a project, iv) reporting requirements, etc.

Each special purpose vehicle owns a respective real estate interest in one or more Brownfields projects, and, thus, undertakes some or all environmental remediation liability with respect to their respective Brownfields. These special purpose vehicles 110 may include, for example, the original owner of the Brownfields and/or another entity to whom the original owner has transferred ownership. Each of the special purpose vehicles 110 and their respective Brownfields projects 120 may be qualified by the fund 100 according to criteria as determined by the fund manager 115. Brownfields projects may include, for example, environmental remediation, and one or more of the following: land planning, zoning, construction and infrastructure construction (e.g., streets, sewers, lighting, architectural planning and design, establishing real estate property access from existing highways to the project), communication infrastructure constructions (e.g., telephone, fiber optic access, satellite access and cable access), demolition and remodel.

The fund manager 115 may be, for example, a business organization, individual or group of individuals which act as a money manager for the Brownfields fund 100. The fund manager 115 may have authority to establish criteria for qualifying a particular special purpose vehicle and associated Brownfields project 120 for a BVC, and may solicit money from investors 105 in order to fund these BVCs. The fund manager 115 may, for example, administrate and report on the operations of the Brownfields fund 100.

In accordance with the present invention, the risk of environmental remediation liability for the investors 105 is greatly reduced since the investors 105 are completely passive with respect to the ownership and operations of the Brownfields. The investors 105, for example, have no ownership interest in the Brownfields, have no security interest or mortgage interest in the Brownfields, and, thus, have no obligations of environmental remediation. Instead, upon providing a BVC to a special purpose vehicle 110 for a particular Brownfields project 120, the Brownfields fund 100 may acquire a financial interest in future cash flows from the Brownfields project 120.

Figure 2:
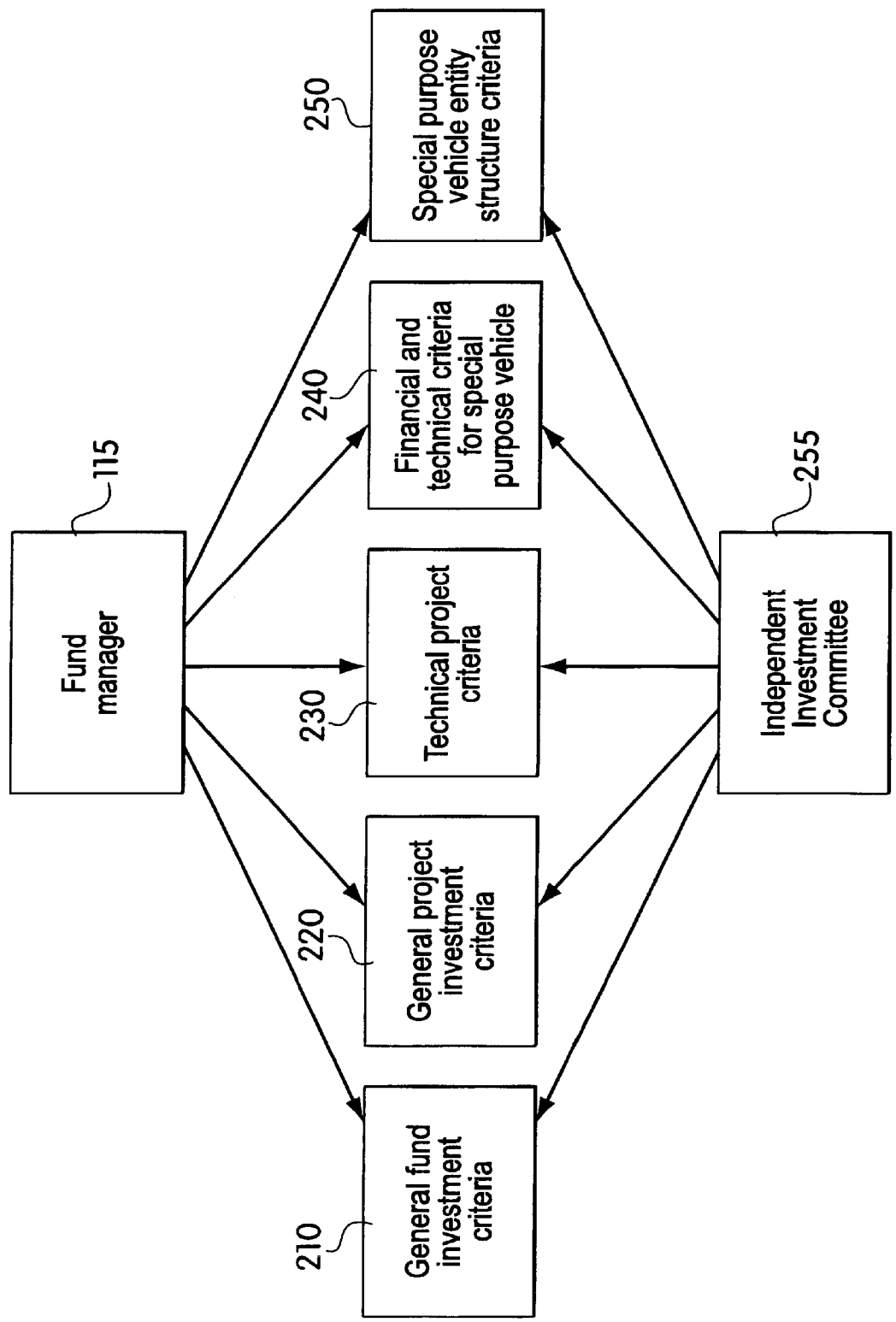
FIG. 2 shows an overview of criteria that the Brownfields fund, the special purpose vehicle and the Brownfields project may be required to meet, according to the example embodiment of the present invention.

Criteria Overview: As noted above, the fund manager 115 may set forth various criteria for approving BVCs to special purpose vehicles for Brownfields projects. As shown in FIG. 2, the fund manager 115 may define general fund investment criteria 210 for the Brownfields fund itself. Furthermore, the fund manager 115 may set forth general project criteria for a Brownfields project 220, technical criteria for the Brownfields project 230, technical criteria for the special purpose vehicle 240 associated with the Brownfields project, and entity structure criteria 250. Assuming the fund manager believes that the Brownfields fund itself, the particular special purpose vehicle in issue and the Brownfields project in issue meet all of the required criteria, the fund manager may recommend BVC approval.

In the example embodiment, an Independent Investment Committee 250 may be required to concur with the recommendation of the fund manager 115 before a capital investment is finally approved. The Independent Investment Committee 250 may be comprised of persons having expertise in areas of environmental engineering, environmental law, real estate development, real estate development project feasibility analysis, real estate finance and real estate investment fund analysis. The member of the Independent Investment Committee typically should have no interest in the fund or in any entity any way involved in investments reviewed by the Committee.

General Fund Investment Criteria: FIG. 3 illustrates examples of general fund investment criteria 210 used by the fund manager in determining whether or not the Brownfields fund should make an investment in any BVC. As shown in element 305, in accordance with the example embodiment of the present invention, the Brownfields fund may invest in BVCs only after receiving a minimum level of investment into the fund. In effect, the Brownfields fund must have a certain amount of capital available with which to invest in BVCs.

Additionally, the Brownfields fund must invest in more than one Brownfields project and more than one BVC (element 310). In an alternative embodiment of the present invention, the Brownfields fund may invest in only one Brownfields project, and one or more BVCs.

Also, the overall investment in the Brownfields fund should be large relative to the size of the BVCs in which the fund invests (element 315). For example, the Brownfields fund may be required to manage between $500 million to $1 billion dollars worth of money, securities, and other assets. A typical BVC may be worth, for example, between $5 million dollars and $50 million dollars. Larger and smaller projects are, of course, possible.

Moreover, the duration of the Brownfields fund, itself, must be long-term relative to the duration of the BVCs in which the fund invests (element 320). For example, the Brownfields fund may have a duration of three to ten years, while typical BVCs may have durations of 12 months to 120 months.

Each of the criteria 305, 310, 315 and 320 are established to ensure that the Brownfields fund adequately spreads its financial risk.

Additionally, in accordance with the present invention, the investors in the Brownfields fund must be completely passive with respect to all of the Brownfields projects in which the Brownfields fund invests through a BVC (element 325). Neither the investors, nor the Brownfields fund itself should take any ownership interest in the Brownfields. For example, neither the investors nor the Brownfields fund should take a security interest or mortgage interest in the Brownfields. Accordingly, the risk of the investors of the Brownfields fund incurring environmental remediation liability is greatly reduced, if not eliminated.

Finally, the possibility of leveraging the fund may be a factor (element 330) to reduce the cost of the BVC.

General Project Investment Criteria: FIG. 4 illustrates examples of general project investment criteria 220 that the fund manager may require a particular Brownfields project to meet in order for the Brownfields fund to make a BVC. In accordance with the example embodiment of the present invention, the duration of the financing (i.e., the duration of the BVC) for a particular Brownfields project must be less than a predetermined authorized duration (element 405). Additionally, the target rate of return for the Brownfields fund must be greater than a predetermined minimum (element 410). Furthermore, the investment or capital investment amount to the particular BVC must be greater than a predetermined minimum amount (element 415) and less than a predetermined maximum amount (element 420).

Technical Project Criteria: FIG. 5 illustrates examples of technical project criteria 230 which the Brownfields project may be required to meet in order to qualify for a capital investment from the Brownfields fund. In accordance with the example embodiment of the present invention, the cash flow participation in the particular BVC should be at a predetermined level (element 501). For example, the capital investment made by the Brownfields fund to the special purpose vehicle for the particular Brownfields project may be exchanged for future cash flow of the Brownfields project. That is, the Brownfields fund may be entitled to a share of the revenue of the Brownfields project until the capital investment (plus interest or return) is recovered, in accordance with the terms of the BVC.

The fund manager may also set forth the types of real estate development approved for the Brownfields project (element 502). For example, the building of an industrial complex may be an approved type of Brownfields project, while the building of an apartment building may not be. The fund manager may revise criteria from time to time in response to changes in various markets.

As shown, the Brownfields project may be required to meet certain geographic standards (element 505). For example, in an example embodiment of the present invention, the Brownfields may be required to be located in one of a number of acceptable states or counties in the United States. Moreover, demand for the proposed development project in the particular geographic area should be adequate.

Additionally, the type of contamination associated with the Brownfields may be required to be in one of a number of contamination categories (element 510). For example, in one embodiment of the present invention, contamination due to an oil spill or leakage may be within an "approved" category, while contamination due to nuclear waste may not be.

Also, the fund manager may set forth certain standard for risk management in association with the Brownfields project (element 520). For example, the special purpose vehicle may be required to assure that adequate and trained staff qualified to perform the proposed development of the Brownfields project will be used and risk management is appropriate (e.g., insurance, indemnities).

Finally, the fund manager may require evaluation of all available government subsidies, grants, etc (element 525).

Technical Criteria For Special Purpose Vehicles: FIG. 6 shows example technical criteria which the special purpose vehicle (240) may be required to meet in order to be approved by a fund manager. The special purpose vehicle may be required to have a certain level of expertise in real estate development (element 605). For example, the special purpose vehicle may be required to have been involved with at least a specified number of large-scale real estate development projects. For example, the special purpose vehicle may be required to have principals with minimum net worth requirements and references.

Additionally, the special purpose vehicle may be required to have a certain minimum level of expertise in pollution remediation (element 610). Moreover, the special purpose vehicle may be required to have expertise in environment risk management (element 615). Finally, the special purpose vehicle may be required to have a certain expertise in land use planning (element 620). In one embodiment of the present invention, criteria 610, 615 and 620 may be met by the special purpose vehicle by, for example, retaining, or consulting or partnering with a technical consultant in these areas.

The fund manager may also evaluate the financial strength of the special purpose vehicle to meet contractual obligations (element 625)

Approved Entity Structures: As noted above, the fund manager may also establish approved entity structures for the special purpose vehicle (element 250). FIG. 7 illustrates examples of approved entity structures. Approved entity structures may include, for example, a joint venture between an original owner of the Brownfields and a real estate developer (element 705), a limited liability company, partnership, trust or corporation formed and owned by a real estate developer (element 710), a limited liability company, partnership, trust or corporation formed and owned by an original owner, a real estate developer and other partners (element 715), and a limited liability company, partnership, trust or corporation formed and owned by a developer and partners to purchase Brownfields over time with fixed installments, contingent installments or fixed installments in combination with cash flow participation (element 720). Other entity structures are, of course, possible. Moreover, the original owner of the Brownfields may be so anxious to remove the Brownfields from its balance sheet that the original owner actually pays another entity, e.g., a special purpose vehicle, to accept title to the Brownfields.

Figure 8:
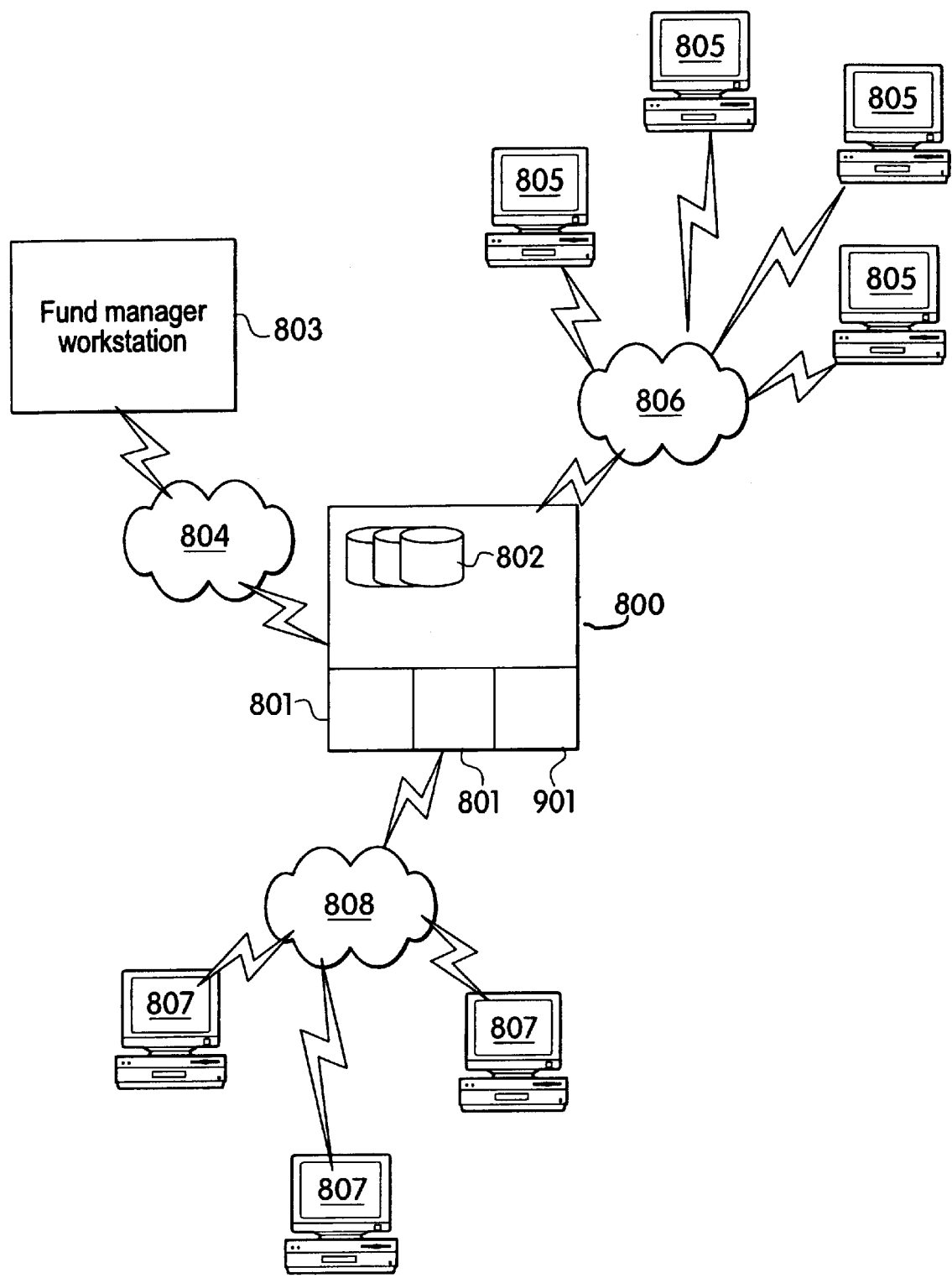
FIG. 8 shows the overall architecture of a computer based system for Brownfields development investing.

Computer Based System: FIG. 8 illustrates a computer based system for Brownfields investing in accordance with an example embodiment of the present invention. Information concerning the Brownfields fund may be stored, managed and updated at a central site 800. The central site 800 may include, for example, one or a number of server systems 801 (each including, for example, a processor, memory, and various peripheral devices). The central site 800 may also include a number of databases (stored on storage devices) 802 coupled to one or more of the server systems 801.

The fund manager may access and update the Brownfields fund information using, for example, a fund manager workstation 803 coupled to the central site 800 via a network 804. The network may include, for example, a telecommunications network, a local area network, a wide area network, the Internet, etc. Of course, it is also possible that the fund manager workstation is directly coupled to the central site 800. The fund manager workstation 803 may be required to log into one of the server systems 801 in order to access and update information.

Investors (current and potential) may request or access information concerning the Brownfields fund, review and update investor account information, authorize fund transfers into the Brownfields fund, etc., using investor workstations 805 coupled to the central site 800 via a network 806. The network 806 may include, for example, the Internet, and investor workstations 805 may be provided secure links to the central site for some types of transactions. Other networks such as a telecommunications network, a local area network, a wide area network, etc., are, of course possible. Each investor workstation 805 may be required to log into one of the servers 801 at the central site 800 in order to access and/or update information.

Special purpose vehicles may also request or access information concerning the Brownfields fund, review and update special purpose vehicle account information, transmit Brownfields project proposals, using, for example, SPV workstations 807 coupled to the central site 800 via a network 806. Each SPV workstation 807 may be required to log into one of the server systems 801 in order to access and/or update information.

Figure 9A:
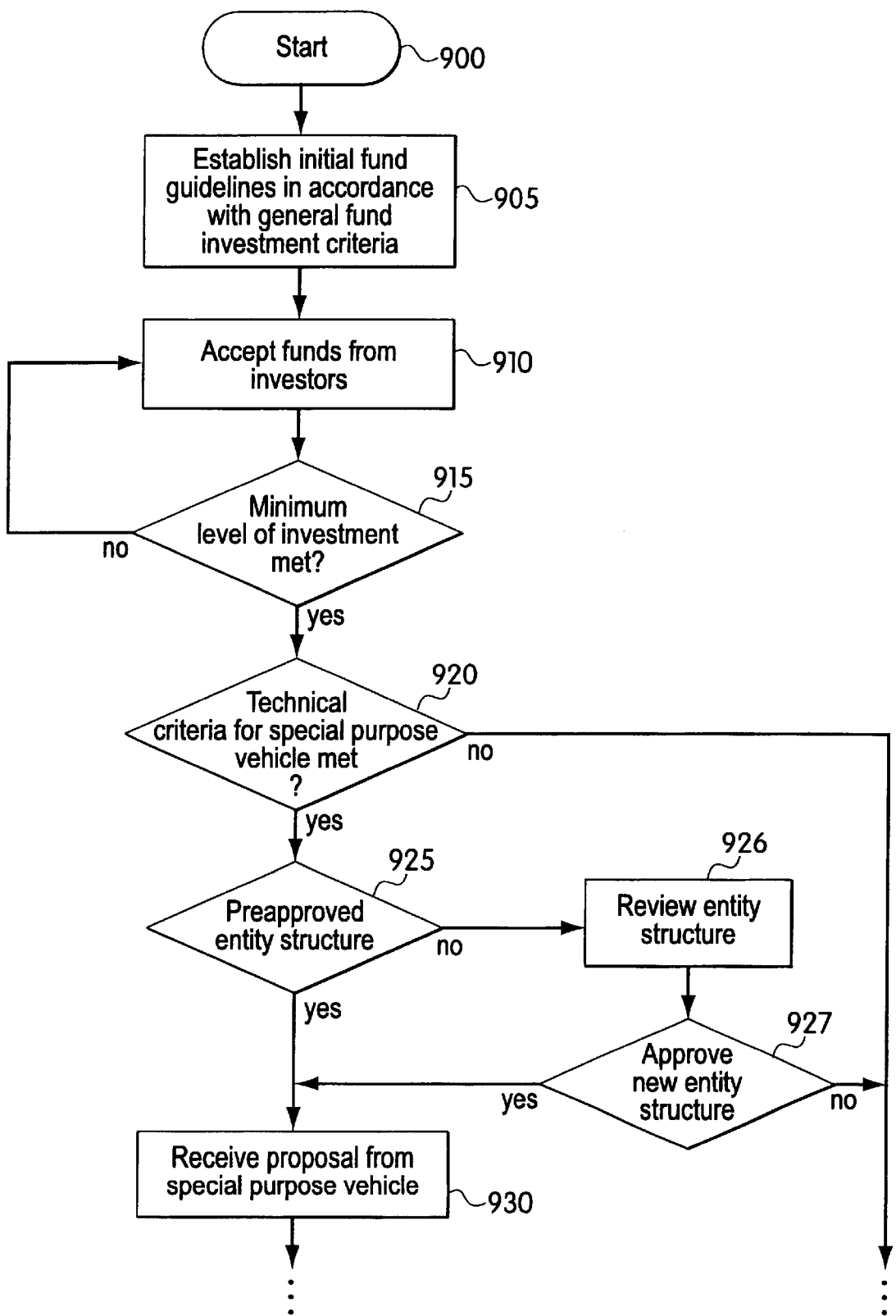
FIG. 9 is a flowchart showing an example method for establishing a fund and for approving special purpose vehicles and their respective Brownfields process, according to an example embodiment of the present invention.
Figure 9B:
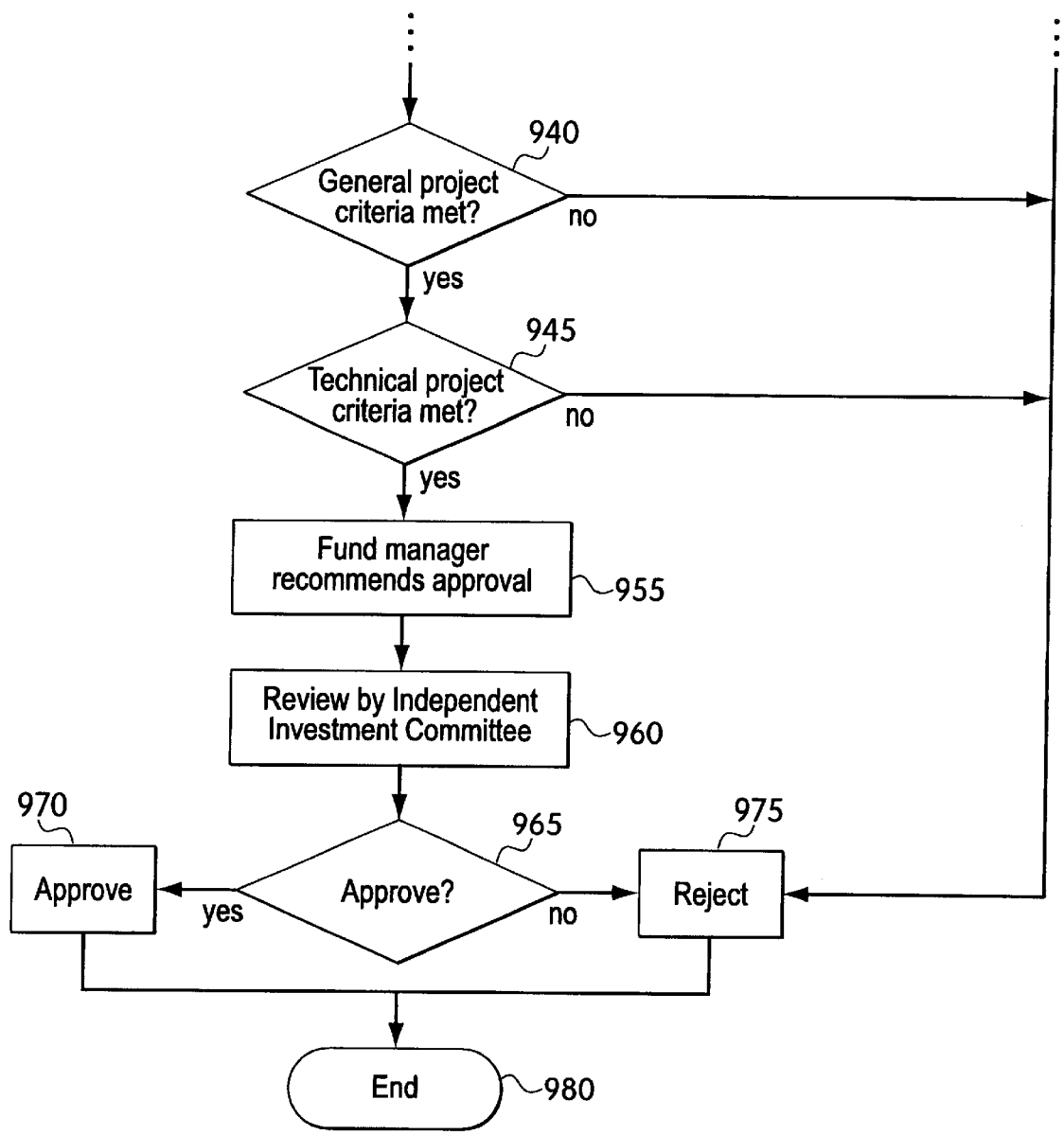

Fund Formation/Approval Process: FIG. 9 is a flowchart showing an example method for establishing a fund and for approving special purpose vehicles and their respective Brownfields projects. This method may be partially or completely performed using the computer based system shown in FIG. 8. The method may also be carried out without any computer based system.

In accordance with an example embodiment of the present invention, initial fund guidelines are established for the Brownfields fund in accordance with the general fund investment criteria described above (step 905). These guidelines may be input, for example, from the fund manager terminal and stored in databases at the central site.

Once the guidelines are established, the Brownfields fund begins accepting funds (i.e., investments or capital) from investors (step 910). In accordance with the present invention, the investors may transmit funds to the Brownfields fund via, for example, mail, electronic funds transfer, hand delivery, or may authorize a funds transfer via an investor workstation or via a telephone.

As soon as the investment level is high enough (steps 915, 910), the Brownfields fund determines whether or not prospective special purpose vehicles meet the technical criteria (step 920), as discussed above in connection with FIG. 6. Also, the fund manager determines whether or not the special purpose vehicle is in the form of one of the pre-approved entity structures (as described in connection with FIG. 7, for example) (step 925). A list of the pre-approved structures may be stored at the central cite in, for example, one of the databases. The fund manager may use an expert system or another computer-based system to compare the details of the form of the special purpose vehicle (provided by the special purpose vehicle in connection with the proposal) with the pre-approved entity structure. Alternatively, the fund manager may manually perform the comparison. If the special purpose vehicle is not in the form of a pre-approved entity structure, the fund manager may need to review details of the structure of the special purpose vehicle to determine whether or not the special purpose vehicle is in an acceptable form (steps 926, 927). (In an alternative embodiment of the present invention, the predetermined entity structures are merely suggested structures.)

Assuming the special purpose vehicle meets the technical criteria (for example, as described in connection with FIG. 6) and the form of the special purpose vehicle is determined to be acceptable, the Brownfields fund receives a project proposal from the special purpose vehicle (step 930). A Brownfields project proposal may be transmitted to the fund manager via, for example, mail, facsimile, hand delivery, etc., or may be electronically transmitted to the central site via an SPV workstation. Details of the proposal may be manually or automatically entered and stored at the central site.

In the example embodiment of the present invention, once a particular proposal is received, Next, the fund manager determines whether or not the proposed Brownfields project meets the general project investment criteria, for example, as described in connection with FIG. 4 (step 940). If not, the proposal is rejected (step 975). If the proposed Brownfields project does meet the general project investment criteria, the fund manager determines whether or not the proposed Brownfields project meets the technical project criteria, as described in connection with FIG. 5 (step 945). If either of these criteria are not met, the proposal is rejected (step 975).

According to the present invention, the fund manager may perform steps 920, 940 and 945 using a computer rules-based system (other systems are possible). For example, each of the general project criteria, technical project criteria and technical criteria for the special purpose vehicle may be stored in the system in the form of a rule. Using the rules-based system, the details of the project proposal may be compared to the stored rules. Thus, steps 920, 940 and 945 may be performed automatically at the central site. Alternatively, the criteria may be stored in databases, and printed out by the fund manager. The fund manager could then manually compare the details of the project proposal to the criteria.

If all of the above-described criteria are met, the fund manager recommends approval of a capital investment to the special purpose vehicle for the Brownfields project (step 955). The proposal is then reviewed by the Independent Investment Committee (960) for final approval. The Independent Investment Committee may review the proposal as compared to the same criteria used by the fund manager, or may review the proposal in terms as compared to other criteria.

Finally, if the Independent Investment Committee approves the proposal (step 965), the special purpose vehicle and proposed Brownfields project is finally approved (step 970), thus the Brownfields fund provides a capital investment to the special purpose vehicle for the proposed Brownfields project through the terms of a BVC. Otherwise, the proposal is rejected (step 975). An indication that the capital investment has been approved or rejected may be transmitted to the special purpose vehicle electronically by the central site. Alternatively, the fund manager or the Independent Investment Committee may provide the indication via the telephone or mail.

Figure 10:
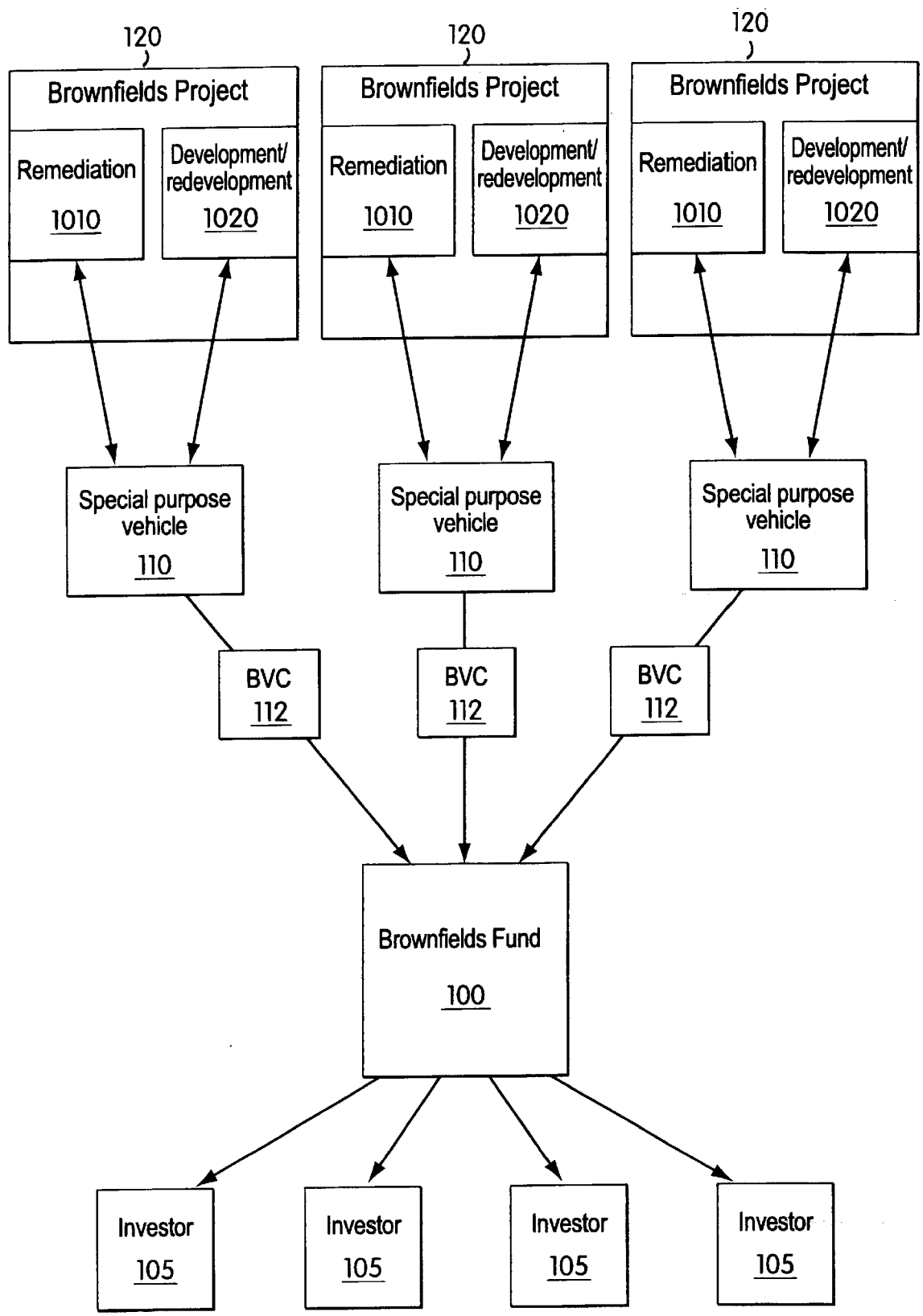
FIG. 10 shows an overview of cash flows associated with the present invention.

Cashflow Overview: FIG. 10 shows an overview of cash flows associated with the present invention. As shown, each Brownfields project 120 may include two sources of cash flows. In particular, both the remediation phase 1010 (i.e., the clean-up) of the Brownfields project 120 and the development/redevelopment (e.g., the actual construction project) may each generate a cash flow for the special purpose vehicle 110.

According to the example embodiment of the present invention, each special purpose vehicle 110 is required under the terms of, for example, the Brownfields Value Contract with the Brownfields fund 100, to pay to the Brownfields fund 100 a certain share of the special purpose vehicles's (future) cash flow. Thus, a cash flow to the Brownfields fund 100 is generated once the special purpose vehicle's cash flow is realized.

Moreover, according to the example embodiment, each investor 105 is entitled, under the terms of, for example, an Investor Investment Contract, to a certain portion of the cash flow received by the Brownfields fund 100.

Figure 11:
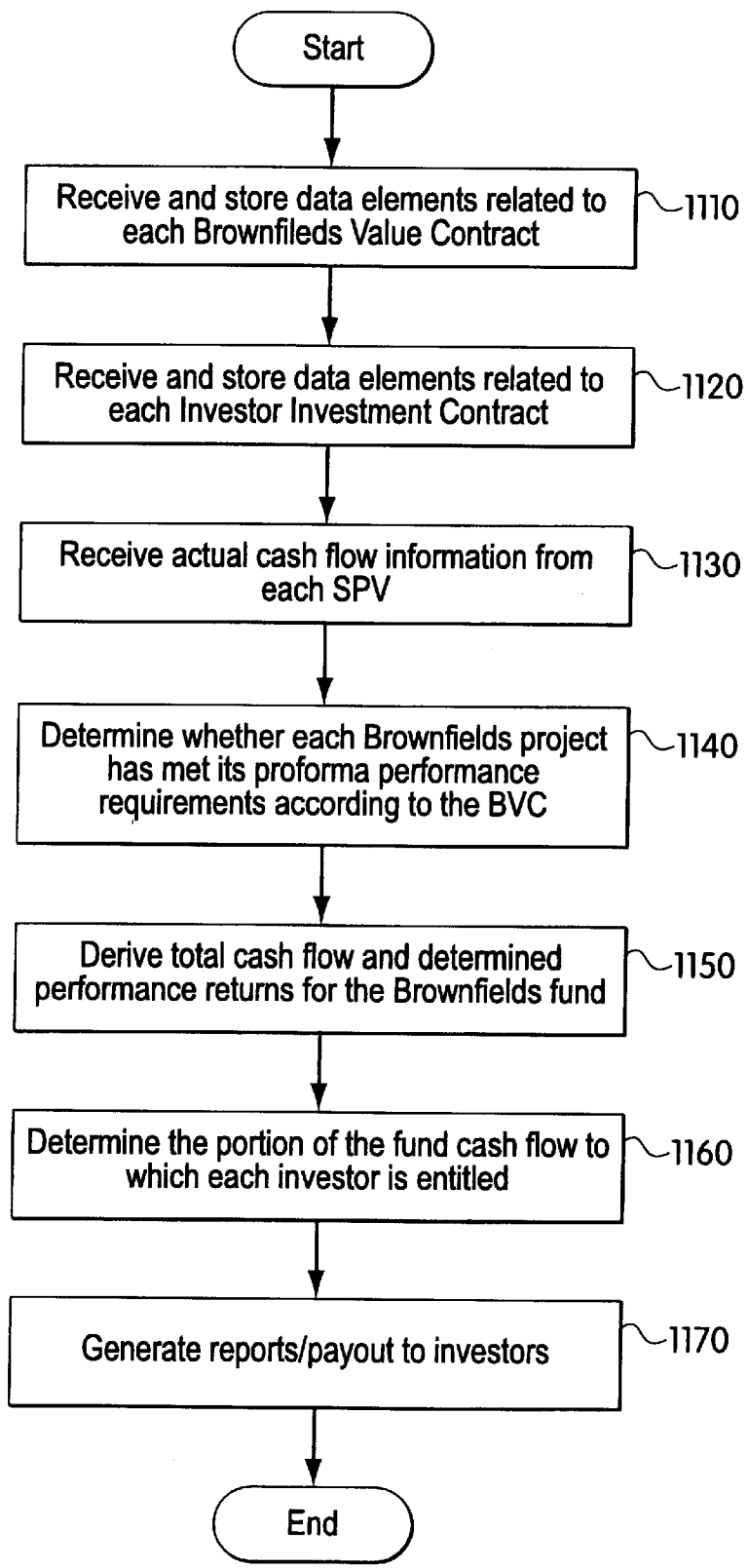
FIG. 11 is a flowchart illustrating the administration of cashflows in accordance with the present invention.

Cashflow Administration: FIG. 11 is a flowchart illustrating the administration of cashflows in accordance with the present invention. The administration may be performed using the computer based system shown in FIG. 1.

Initially, data related to each BVC are received and stored at, for example, in a data base at the central site (step 1110). The data may include an identification of the special purpose vehicle, ownership distribution requirements, cash flow requirements, equity contributions and performance requirements. Additionally, data related to each investor and investment contract may be received and stored in the data base at the central site (step 1120). For example, an identification and address of each investor, as well as an indication of each investors total investment, terms of the investment and/or any investment agreements.

Next, as a Brownfields project progresses, each special purpose vehicle transmits to the central site an indication of the special purpose vehicle's actual cash flow in connection with the Brownfields project (step 1130). This indication may be transmitted electronically, or may be, for example, hand delivered, delivered by mail or deposited into a bank lockbox system and subsequently entered into a database at the central site.

A determination is then made as to whether each of the Brownfields projects has met its performance requirements (step 1140). This determination can be made, for example, by comparing the performance requirements of each Brownfields project to the actual cash flow from the special purpose vehicle associated therewith.

The total cash flow to the Brownfields fund can then be determined (step 1150) by, for example, summing the actual cash flow from each special purpose vehicle. Additionally, the portion of the total fund cash flow to which each investor is entitled can be determined as a function of the data stored in connection with the Investor Investment Contracts (step 1160).

Finally, reports can be generated at the central site for distribution to the investors (step 1160), showing, for example, the performance of the Brownfields fund, and possibly each Brownfields project and/or special purpose vehicle. Additionally, each investor may be paid (either electronically or otherwise) a respective share of the total cash flow (i.e., a return on investment) in accordance with the terms of the Investor's Investment Contract.

What is claimed is:

1. A method for investing in Brownfields, comprising:
   establishing a Brownfields fund, the Brownfields fund providing investment capital on a non-recourse basis for Brownfields projects and remaining passive with respect to the Brownfields projects;
   receiving investor capital from investors;
   approving an entity for the investment capital on the non-recourse basis for a respective one of the Brownfields projects according to predetermined criteria, the entity having an ownership interest in a Brownfields associated with the one of the Brownfields projects; and
   providing the investment capital on the non-recourse basis to the approved entity using at least some of the investor capital from the investors.

2. The method according to claim 1, wherein the entity is a special purpose vehicle.

3. The method according to claim 1, wherein the providing step includes providing a Brownfields Value Contract to the entity, the investment capital being provided to the approved entity in accordance with terms of the Brownfields Value Contract.

4. The method according to claim 1, further comprising:
   wherein the providing step includes exchanging by the approved entity an interest in future cashflows from the respective one of the Brownfields project for the investment capital from the Brownfields fund.

5. The method according to claim 3, wherein the establishing step includes establishing the Brownfields fund so that the Brownfields fund is long-term in duration relative to durations of the Brownfields Value Contract.

6. The method according to claim 1, wherein the establishing step includes establishing the Brownfields fund so that a size of the Brownfields fund is large relative to respective sizes of each capital investment made by the Brownfields fund.

7. The method according to claim 1, wherein the providing step includes providing the investment capital to entities only after a investment level is above a predetermined minimum.

8. The method according to claim 1, further comprising:
   providing a return on investment to each one of the investors as a function of an amount of respective capital provided by the one of investors.

9. The method according to claim 8, wherein the step of providing the return on investment includes providing the return on investment as a function of cashflow from the Brownfields projects.

10. The method according to claim 1, wherein the receiving capital step includes receiving the investments electronically.

11. The method according to claim 1, wherein the receiving capital step includes receiving the investments via mail.

12. The method according to claim 1, wherein the establishing step includes receiving investments from investors for use in providing the non-recourse capital investments, each of the investors being passive relative to all of the Brownfields projects.

13. The method according to claim 1, further comprising:
   storing information related to each of the Brownfields projects; and
   storing information related to the borrower.

14. The method according to claim 1, wherein the Brownfields project is at least one of: i) a development project, ii) a redevelopment project, and iii) an environmental remediation project, and wherein the Brownfields fund does not take an ownership interest in a Brownfields associated with the Brownfields project.

15. A Brownfields investment vehicle, comprising:
   a Brownfields fund providing investment capital to at least one approved entity on a non-recourse basis for at least one project involving at least one Brownfields without taking an ownership interest in the at least one Brownfields, the Brownfields fund remaining passive with respect to the at least one project, receiving investor capital from at least one investor and providing a return on investment to the at least one investor.

16. The Brownfields investment vehicle according to claim 15, wherein the at least one approved entity includes a plurality of approved entities.

17. The Brownfields investment vehicle according to claim 15, wherein the at least one project includes a plurality of projects.

18. The Brownfields investment vehicle according to claim 15, wherein the at least one Brownfields includes a plurality of Brownfields.

19. The Brownfields investment vehicle according to claim 15, wherein the at least one Brownfields includes a plurality of investors.

20. The Brownfields investment vehicle according to claim 15, further comprising:
   at least one Brownfields Value Contract setting forth terms and conditions of the provision of the investment capital by the Brownfields fund to the at least one approved entity, the Brownfields fund providing the investment capital to the at least one approved entity in accordance with the at least one Brownfields Value Contract.

21. The Brownfields investment vehicle according to claim 15, wherein the at least one project includes at least one of: i) a development project, ii) a redevelopment project, and iii) an environmental remediation project.

22. The Brownfields investment vehicle according to claim 20, wherein the at least one Brownfields Value Contract describes an exchange of an interest in future cashflows flowing from the at least one Brownfields project for the investment capital by the at least one approved entity.

23. The Brownfields investment vehicle according to claim 20, further comprising:
   a storage medium storing an indication of at least some of the terms and conditions of the Brownfields Value Contract.

24. A method for managing a Brownfields fund, comprising:
   storing in a computer system information relating to a Brownfields fund;
   accepting investor capital from at least one investor;
   storing information in the computer system relating to the at least one investor, the stored information including investor identification information, investment amounts, and terms of investments;
   storing information in the computer system concerning an entity and a project involving a Brownfields, the entity having an ownership interest in the Brownfields;
   approving the entity and the Brownfields project according to predetermined criteria using the information stored in the computer system concerning the entity and the Brownfields project; and
   providing investment capital by the Brownfields fund to the approved entity for the approved Brownfields project on a non-recourse basis without taking any ownership interest in the approved Brownfields project.

25. The method according to claim 24, wherein the providing the investment capital step includes exchanging by the approved entity an interest in future cashflows from the Brownfields project for the investment capital.

26. The method according to claim 24, wherein the providing step includes providing a Brownfields Value Contract to the approved entity, and further comprising the step of:
   storing the terms of the Brownfields Value Contract in the computer system.

27. The method according to claim 25, further comprising:
   receiving by the Brownfields fund a portion of cashflows from the Brownfields project to generate at least a portion of a fund cashflow; and
   determining a portion of the fund cashflow to which each of the at least one investor is entitled as a function of the terms of investment stored in the computer system.

28. A method of investing in Brownfields, comprising:
   providing investor capital by an investor to a Brownfields fund in accordance with predetermined terms of investment, the Brownfields fund providing investment capital on a non-recourse basis for Brownfields projects and remaining passive with respect to the Brownfields projects, the Brownfields fund approving an entity for the investment capital on the non-recourse basis for a respective one of the Brownfields projects according to predetermined criteria, the entity having an ownership interest in a Brownfields associated with the one of the Brownfields projects, the investment capital being provided on the non-recourse basis to the approved entity using at least some of the investor capital from the investor without taking any ownership interest in a Brownfields property associated with the one of the Brownfields projects; and
   receiving by the investor a return on investment, the return on investment being determined as a function of the predetermined terms of investment.

29. The method according to claim 28, wherein the approved entity exchanges an interest in future cashflows from the one of the Brownfields projects for the investment capital, and wherein the return on investment is determined as a function of actual cashflows generated by the one of the Brownfields projects to the Brownfields fund.

* * * * *

UNITED STATES PATENT AND TRADEMARK OFFICE
CERTIFICATE OF CORRECTION

PATENT NO. : 6,253,191 B1
DATED : June 26, 2001
INVENTOR(S) : Hoffman et al.

It is certified that error appears in the above-identified patent and that said Letters Patent is hereby corrected as shown below:

Title page,
Item [56], References Cited, please add the following:

OTHER PUBLICATIONS

Statutory and Regulatory Provisions - Comprehensive Environmental Response, Compensation, and Liability Act (CERCLA), pp. 6-36

Opening Pandora's Box. IP Magazine, January 1999. Http://209.157.181.6/monthly/99-jan/kunstadt.html. Visited on 7/10/99, 4 pages.

EMSOURCE. Http://www.emsource.com/; Visited on December 9, 1999; 19 pp.

EPA Brownfields Cleanup Revolving Loan Fund Pilots. August 1999. EPA 500-F-99-168, 2 pages.

Environmental Law for the New Millennium. The Houston Lawyer, March/April 1999, pp. 40-47.

Paula Moore "Reits breaking new ground" The Denver Business Journal. Real Estate, A quarterly report on development, design, sales and leasing. April 24-30, 1998; 5 pages.

Joseph C. Shenker et al., Asset Securitization: Evolution, Current Issues and New Frontiers; 69 Texas Law Review 1369; May, 1991, 66 pages.

Susan M. Hollinghead, Environmental Insurance Summary; 2 pages

List of Brownfields-related companies, June 2000; 8 pages

Douglas A. Smith, Effective Negotiating and Remediation of Brownfield Properties, February 25, 1999, 7 pages.

Agra Earth and Environmental. Http://www.agra.com/; visited on May 30, 2000; 18 pp.

AIG Environmental, Cleanup Cost Cap Program. Remediating Contaminated Real Estate: A financially Sound Decision.; 13 pages.

AIG Environmental, Innovation Update, Issue 17, 1997; 4 pages.

AIG Brochure, AIG Environmental, 5 pp.

The Hemisphere Network (HemNet) - AIG Deregulation Sponsor. Http://www.deregulationinc.com/; visited on May 30, 2000; 12 pp.

AMB. Http://www.amb.com/ ; visited on June 7, 2000; 2 pp.

Apex Envirotech, Inc. http://www.apexenvirotech.com/ ; visited on June 7, 2000 ; 4 pp.

ARCADIS - Internet/Part of a bigger picture ; Http://www.arcadis.nl/arcadis/; visited on June 7, 2000; 25 pp.

Booz-Allen & Hamilton. Http://www.bah.com/; visited on May 30, 2000; 4 pp.

The Brownfields Non-Profits Network. Http://www.brownfieldsnet.org/; visited on June 7, 2000; 10 pp.

Brownfields Recovery Group. Http://www.brownfields-recovery.com/; visited on May 30, 2000; 15 pp.

Brownfields Redevelopment International. Http://www.brnfldsred.com/; visited on April 3, 2000; 3 pp.

"Mr. Brownfields' cleans up"; Small Business, Apr. 16, 1999, l p.

UNITED STATES PATENT AND TRADEMARK OFFICE
CERTIFICATE OF CORRECTION

PATENT NO. : 6,253,191 B1
DATED : June 26, 2001
INVENTOR(S) : Hoffman et al.

It is certified that error appears in the above-identified patent and that said Letters Patent is hereby corrected as shown below:

Title page, (cont'd)

Brownfields Redevelopment International. Http://www.brnfldsred.com/; visited on May 31, 2000; 7 pp.

CB Richard Ellis: Navigating a New World. Http://www.cbcommercial.com/; visited on June 7, 2000; 9 pp.

Cherokee Investment Security Brochure. 8 pp.

The Cherokee Companies, Cherokee Summary Statement of Qualifications, 2 pages

The Cherokee Companies, Cherokee Asset Protection Program (CAPP), 2 pages

Cherokee Investment Security Acquires Properties from Borden Inc.; Equity Fund Hits $300 Million in Acquistion of Enviornmentally Impaired Sites, December 19, 1997, 3 pages Robert Schwab, Group Boys Kmart Canada, The Denver Post, June 17, 1997, 1 page Emily Narvaes, Firm Buys Sites With Cleanup Woes, The Denver Post, January 10, 1998, 1 page Cherokee Investment Security. Http://www.cherokee-llc.com/; visited on January 9, 1998; 9 pp.

"Pacifica, Cherokee Team Up," Denver Business Journal. February 21, 1997; 2 pp.

Investment Profiles. Http://www.kochventures.com/inv_pro.htm; visited on April 3, 2000; 1 p.

Cherokee Investment Security. Environmental Risk Management; Http://www.cherokee-llc.com/; visited on May 31, 2000; 6 pp.

Coopers and Lybrand. Financial Advisory Services; Nov. 25, 1997, 10 pp.

Letter from Jo Drake of Dames and Moore to Distribution List regarding 2nd Annual City of Houston Brownfields Workshop; September 28, 1999; 1 p.

Dames and Moore Group. Http://www.thestandard.com/companies/display/0%2C2063%2C15611%2C00.html; visited on May 31, 2000; 2 pp.

Developers Diversified Realty Corporation. Http://www.ddrc.com/; visited on June 7, 2000; 3 pp.

ECON The Premier Venture Manager and Investment Partner Brochure. 6 pp.

ECON Solutions. Http://www.econsolutions.com/; visited on June 2, 2000; 9 pp.

ELM Investments, L.L.C. Http://www.elmllc.com/; visited on May 30, 2000; 4 pp.

EMSOURCE. Putting Environmental Liability in its Place; Http://www.emsource.com/; visited on November 2, 1999; 12 pp.

Environmental Capital Insurance Brokerage, Inc. Brochure. 5 pp.

Environmental Capital Insurance Brokerage, Inc. Http://www.envcapital.com/; visited on June 2, 2000; 8 pp.

ERIC Solutions to Environmental Risk. Http://www.ericcompanies.com/; visited on January 9, 1998; 3 pp.

ERIC. Http://www.ericcompanies.com/; visited on June 2, 2000; 19 pp.

ERM. Environmental Resources Management. Brownfield Successes, Examples of Successful Projects 1996-1999; 1 p.

ERM. Http://www.erm.com/; visited on June 2, 2000; 2 pp.

ETG. Http://www.etg-rrsm.com/; visited on May 30, 2000; 6 pp.

UNITED STATES PATENT AND TRADEMARK OFFICE
CERTIFICATE OF CORRECTION

PATENT NO. : 6,253,191 B1
DATED : June 26, 2001
INVENTOR(S) : Hoffman et al.

It is certified that error appears in the above-identified patent and that said Letters Patent is hereby corrected as shown below:

Title page, (cont'd),

Great Lakes Environmental Finance Center. Http://www.csuohio.edu/; visited on June 7, 2000; 2 pp.

Houston Mayor's Office of Environmental Policy Brownfields Redevelopment Program; October 12, 1999; 2 pp.

Houston Mayor's Office of Environmental Policy Brownfields Redevelopment Program; Sept. 22 1999; 2 pp.

Industrial Recovery Capital Holdings Company Brochure. 7 pp.

KEERA. An Environmental Real Estate Investor Brochure. 2 pp.

KEERA. An Environmental Real Estate Investor. Http://www.keera.com/; visited on June 2, 2000; 11 pp.
Land Bank. Http://www.landbank.net/; visited on May 30, 2000; 11 pp.

LAW. Engineering and Environmental Services, Inc. 6 pp.

Brownfields Workshop Panel Discussion; October 12, 1999; 21 pp.

Environmental Services. Http://www.law-usa.com/; visited June 2, 2000; 5 pp.

LFR Ventures, Inc. Developing Environmentally Impaired Real Estate Brochure. 14 pp.

The Massachusetts Brownfields Strategy Overhead slides, 9 pp.

North American Realty Advisory Services. Http://www.northamericanrealty.com/; visited on May 30, 2000; 8 pp.

Resource Controls. Http://www.resourcecontrols.com/; visited on June 7, 2000; 6 pp.

Clean-Start Properties Unlimited. Http://www.cleanstart.com/; visited on June 7, 2000; 13 pp.

TRC. General Program Description TRC Exit Strategies™ Program; pp. 1-4.

Fialka, John. "Maine Experiment May Point the Way to Ending Tangle of Litigation Around U.S. Superfund Law," The Wall Street Journal; April 29, 1998; 2 pp.

TRC Statement of Qualifications. Brownfields Redevelopment and Environmental Consulting Services. 14 pp.

TRC Implements Innovative Exit Strategy Solution to Close Maine's Largest 'Superfund' Site. Http://www.dakotacg.com/releases/pa/sep99/bz0930a.htm; visited on June 2, 2000; 2 pp.

WB Realty Group. 2 pp.

The Whitman Companies, Inc. Http://www.whitmanco.com/; visited on June 7, 2000; 11 pp.

Brownfields Services. Woodward-Clyde. 7 pp.

URS Corporation. Http://www.wcc.com/; visited on June 2, 2000; 2 pp.

HR's 2nd Annual In-Depth Forum on Emerging Brownfields Opportunities: How to Optimize Returns & Minimize Risk. February 28-29, 2000; 3 pp.

National Brownfield Association First Annual Conference. Deal-Flow 2000 Distressed Property Marketplace. April 25-26, 2000; 6 pp.

Email message dated March 29, 2000, Better America Bonds Proposal - includes brownfield sites.

UNITED STATES PATENT AND TRADEMARK OFFICE
CERTIFICATE OF CORRECTION

PATENT NO. : 6,253,191 B1  
DATED : June 26, 2001  
INVENTOR(S) : Hoffman et al.

Page 4 of 4

It is certified that error appears in the above-identified patent and that said Letters Patent is hereby corrected as shown below:

Column 1,  
Line 17, change "effected" to -- affected --.

Column 2,  
Line 25, change "1007" to -- 1997 --.

Column 3,  
Line 11, change "expect" to -- expected --.

Column 5,  
Line 54, change "remodel" to -- remodeling --.

Column 8,  
Line 3, change "and risk management" to -- and that risk management --.

Column 10,  
Line 17, change "received, Next, the fund manager" to -- received, the fund manager next --.

Column 11,  
Line 28, change "each investors" to -- each investor's --.

Signed and Sealed this

Nineteenth Day of October, 2004

JON W. DUDAS  
*Director of the United States Patent and Trademark Office*